(No Model.) 
M. E. PONTIOUS.
MACHINE FOR MAKING BIRD TARGETS.
No. 400,870. Patented Apr. 2, 1889.
3 Sheets—Sheet 1.
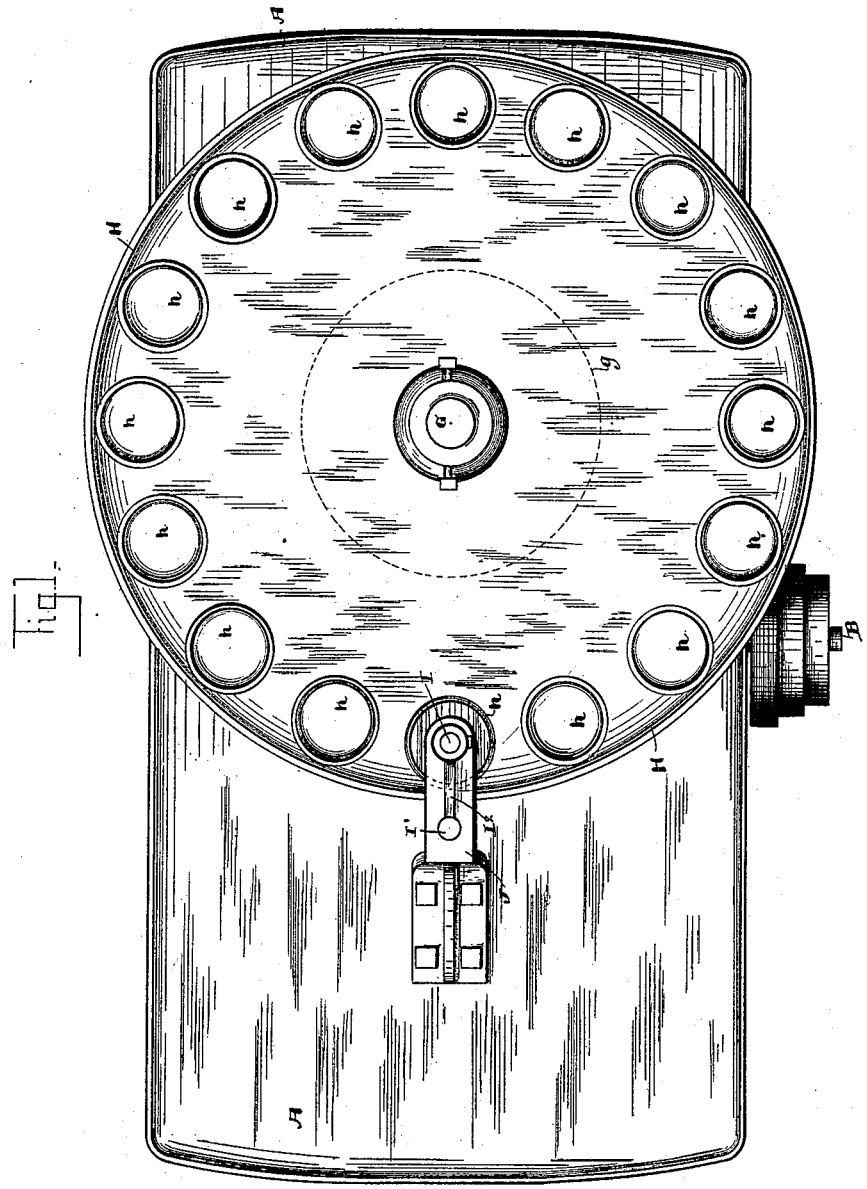
Witnesses.
C. B. Nash
Geo. W. King
Marshal E. Pontious Inventor,
By Liggett & Liggett
Attorneys.

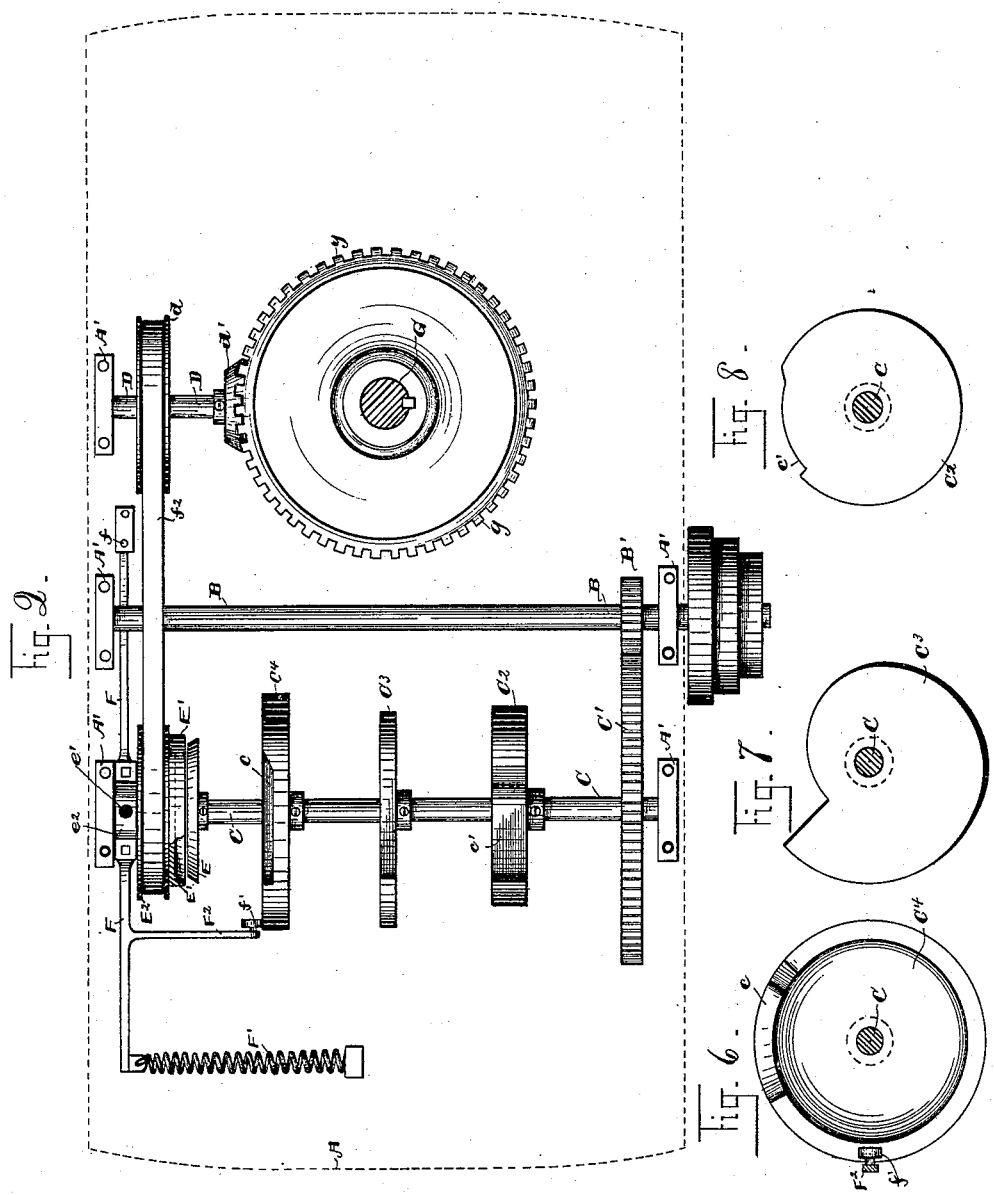

(No Model.) 3 Sheets—Sheet 3.
M. E. PONTIOUS.
MACHINE FOR MAKING BIRD TARGETS.
No. 400,870. Patented Apr. 2, 1889.
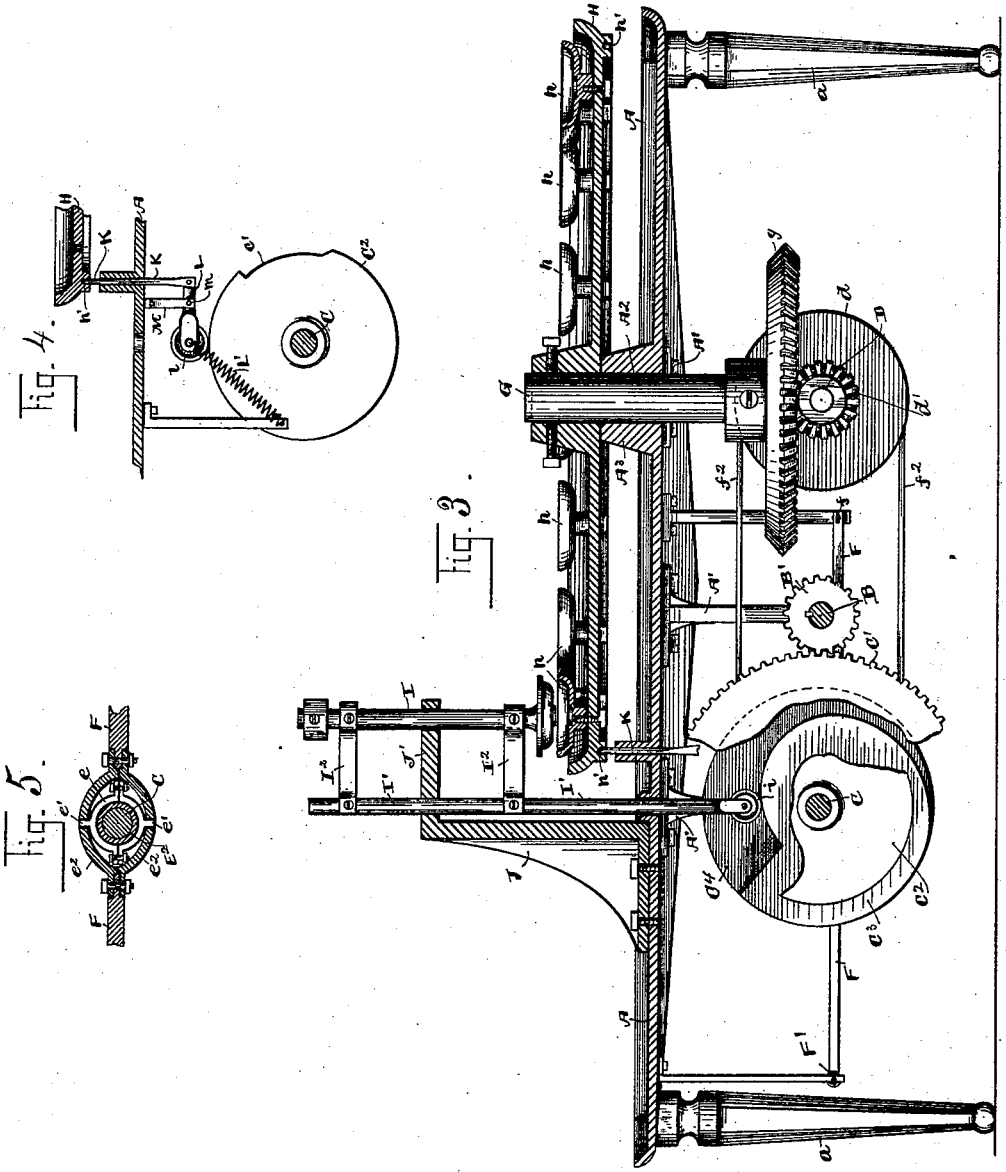
Witnesses.
C. B. Nash.
Geo. W. King
Marshal E. Pontious Inventor
By Liggett & Liggett
Attorneys.

UNITED STATES PATENT OFFICE.

MARSHAL E. PONTIOUS, OF CLEVELAND, OHIO.

MACHINE FOR MAKING BIRD-TARGETS.

SPECIFICATION forming part of Letters Patent No. 400,870, dated April 2, 1889.

Application filed May 31, 1888. Serial No. 275,611. (No model.)

*To all whom it may concern:*

Be it known that I, MARSHAL E. PONTIOUS, of Cleveland, in the county of Cuyahoga and State of Ohio, have invented certain new and useful Improvements in Machines for Making Bird-Targets; and I do hereby declare the following to be a full, clear, and exact description of the invention, such as will enable others skilled in the art to which it pertains to make and use the same.

My invention relates to an improved machine for making bird-targets; and it consists in certain features of construction and in combination of parts, hereinafter described, and pointed out in the claims.

In the accompanying drawings, Figure 1 is a plan. Fig. 2 is a plan with the bed removed. Fig. 3 is a side elevation, in longitudinal section, through the center of the machine. Fig. 4 is an elevation in section of the dogging device. Fig. 5 is an elevation, partly in section, in detail, of the collar and lever for actuating the friction-clutch. Figs. 6, 7, and 8 are side elevations, respectively, of cam-disks $C^2$, $C^3$, and $C^4$.

A represents a bed-plate mounted on legs $a$. Suitable hangers, A', depend from the bed for supporting, respectively, shafts B, C, and D, these shafts being arranged crosswise of the bed, substantially as shown in Fig. 2. The driving-shaft B is provided with cone-pulley $b$ for receiving the driving-belt, by means of which the speed of the machine is regulated. On shaft B is mounted pinion B', engaging gear C' of shaft C. On this latter shaft are also mounted cam-disks $C^2$, $C^3$, and $C^4$. On this shaft is also mounted a friction-clutch, the male member E of which is keyed fast to the shaft C, the other member, E', being mounted loosely on the shaft. Member E' of the clutch is integral or rigidly attached to band-wheel $E^2$. The hub of members E' and $E^2$ has a circumferential groove, in which fits loosely the collar $e$, this collar being made in halves and bolted together substantially as shown in Fig. 5. This collar has laterally-projecting trunnions $e'$, that are pivoted in rings $e^2$, the latter being rigidly secured to the two sections of lever F. This lever is pivoted at $f$, and the free end of the lever is connected with spring F'. The tension of this spring is sufficient to operatively close the friction-clutch. The members of this clutch are held apart against the action of the spring during three-quarters of a revolution of shaft C by means of an arm, $F^2$, and roller $f'$, the arm being connected with lever F and the roller traveling on the laterally-projecting rim of disk $C^4$. This rim is cut away at $c$, leaving a notch or depression that extends one-quarter way around the disk, and when roller $f'$ is opposite this notch the tension of spring F' operatively closes the clutch, so that band-wheel E' makes a quarter-revolution for each entire revolution of shaft C. A belt, $f^2$, leads from band-wheel $E^2$ to the band-wheel $d$, these band-wheels being of equal diameter and the latter being mounted on shaft D. On this shaft is also mounted beveled pinion $d'$, the latter engaging beveled gear $g$. This gear is keyed fast to the upright shaft G. This shaft extends up through the bore $A^2$ of hub $A^3$ of the bed. On the upper end of this shaft is mounted the intermittently-revolving table H, the under side of the table engaging the upper end of hub $A^3$. On the face of the table are a series of molds, $h$, in which the bird-targets are compressed by means of a drop-plunger, I. Any number of these molds may be placed on a table, (more or less,) according to the size of the machine. In Fig. 1 sixteen such molds are shown, these molds being placed at equal intervals in concentric order with the axis of the table. The revolving table must make one revolution while shaft C is making as many revolutions as there are molds on the table, and in the present instance the shaft would make sixteen revolutions while the table was making one revolution. By separating the members of the friction-clutch in the manner already described the table remains at rest for a moment while the plunger is doing its work.

The mechanism for operating plunger I is as follows:

J is a standard secured to the upper face of the bed, this standard having a lateral arm, J', projecting over the table. Through suitable holes in this arm reciprocate the plunger I and rod I', these two members being rigidly connected by tie-bars $I^2$. The lower end of rod I' is provided with a roller, $i$, that travels on the face of cam $C^3$. Rod I' and the attached plunger are gradually elevated by means of the cam until the highest point of the cam is reached, after which the plunger and rod fall by gravity, the end of the plunger compressing the material in the mold, and thereby shaping the bird-target.

To keep the table in accurate adjustment with the mold directly under the plunger, I provide a series of conical holes, $h'$, on the under side of the table corresponding with the molds, and a dog, K, having a conical end for successively engaging these holes when the table is in position and one of the molds directly under the plunger. Mechanism for operating the dog is shown more clearly in Fig. 4. The lower end of the dog is pivoted to lever L, the latter being fulcrumed at $m$ to hanger M and the dog operating through a hole in the bed. The free end of lever L is provided with roller $l$, the latter traveling on the face of cam-disk $C^2$. A spring, L', is connected with the free end of lever L for depressing the same, and thereby elevating the dog whenever notch C' of the cam-disk is in position to receive roller $l$. The parts are so timed that the dog engages a hole, $h'$, in the table just as the friction-clutch is opened and the table is in position with one of its molds under the plunger, and the dog remains in position holding the table stationary while the plunger is doing its work, after which, by the action of cam $C^2$, the dog is withdrawn from its engagement with the table, and this occurs just as the friction-clutch is closed for revolving the table.

There is no special means or mechanism shown for feeding the material to the molds or for removing the target from the molds, such mechanism being reserved for a separate application for Letters Patent. The machine is entirely operative, however, with hand-labor for feeding the material to the mold and for removing the target, and with such hand-labor the machine is a great advance in the art of making bird-targets.

What I claim is—

1. The combination, with a table carrying a series of molds and gearing for imparting a rotary motion to said table, of a shaft, a clutch thereon, driving mechanism connected with the loose sliding section of the clutch for actuating the table-gearing, and devices for automatically opening and closing the clutch to intermittingly rotate the table, substantially as set forth.

2. The combination, with a table, gearing for rotating the same, molds, friction-clutch, motion-transmitting devices connecting the table-gearing and sliding section of the clutch, and a lever for sliding one section of the clutch, of a spring for actuating the lever in one direction and a cam for moving the lever in the opposite direction, the parts being timed to intermittingly rotate the table the distance from one mold to another, substantially as set forth.

3. In a bird-target machine, the combination, with a rotary table carrying molds, a constantly-rotating shaft having a clutch thereon, and power-transmitting devices actuated by the loose section of the clutch for rotating the table, of a plunger actuated by the constantly-rotating shaft, and a dog for locking the table against movement, also actuated by said shaft, substantially as set forth.

In testimony whereof I sign this specification, in presence of two witnesses, this 20th day of February, 1888.

MARSHAL E. PONTIOUS.

Witnesses:
 CHAS. H. DORER,
 ALBERT E. LYNCH.